(12) United States Patent
Drennow

(10) Patent No.: US 7,040,554 B2
(45) Date of Patent: May 9, 2006

(54) SPRAY HEAD

(75) Inventor: Sten Drennow, Lund (SE)

(73) Assignee: ASEPT International AB, Lund (SE)

( * ) Notice: Subject to any disclaimer, the term of this patent is extended or adjusted under 35 U.S.C. 154(b) by 32 days.

(21) Appl. No.: 10/325,567

(22) Filed: Dec. 20, 2002

(65) Prior Publication Data
US 2004/0118948 A1 Jun. 24, 2004

(51) Int. Cl.
B05B 15/00 (2006.01)

(52) U.S. Cl. ............... 239/546; 239/331; 239/602

(58) Field of Classification Search ........... 239/195, 239/196, 349, 451, 452, 455, 533.1, 533.13, 239/533.14, 536, 546, 602, 331
See application file for complete search history.

(56) References Cited

U.S. PATENT DOCUMENTS

| | | | | |
|---|---|---|---|---|
| 2,941,544 A | * | 6/1960 | Peras | 137/844 |
| 3,361,161 A | * | 1/1968 | Schwartz | 261/53 |
| 4,438,884 A | * | 3/1984 | O'Brien et al. | 239/600 |
| 6,464,150 B1 | * | 10/2002 | Zimmer et al. | 239/284.1 |
| 6,739,527 B1 | * | 5/2004 | Chung | 239/558 |

* cited by examiner

Primary Examiner—Christopher Kim
(74) Attorney, Agent, or Firm—Tarolli, Sundheim, Covell & Tummino L.L.P.

(57) ABSTRACT

The present invention relates to a spray head for spreading liquid or semi-liquid products, preferably foodstuff. A product feeder (5) is provided to feed or convey a product (2) through a feed conduit (3) from a product container (4) to the spray head (1) and spraying nozzles (18) are provided to spread the product (2) when it is discharged from the spray head (1). The spray head (1) comprises three separate members, namely an upper coupling member (7), a lower coupling member (8) and a nozzle member (9) provided therebetween. The upper coupling member (7) is connected to the lower coupling member (8) and to the feed conduit (3). The nozzle member (9) and/or the upper coupling member (7) define, when the upper and lower coupling members (7, 8) are interconnected, distributing spaces (13) for distributing product (2). The spraying nozzles (18) of the nozzle member (9) are provided to open and to close. The nozzle member (9) is removable from the upper and lower coupling members (7, 8) when these members have been disconnected from each other.

7 Claims, 4 Drawing Sheets

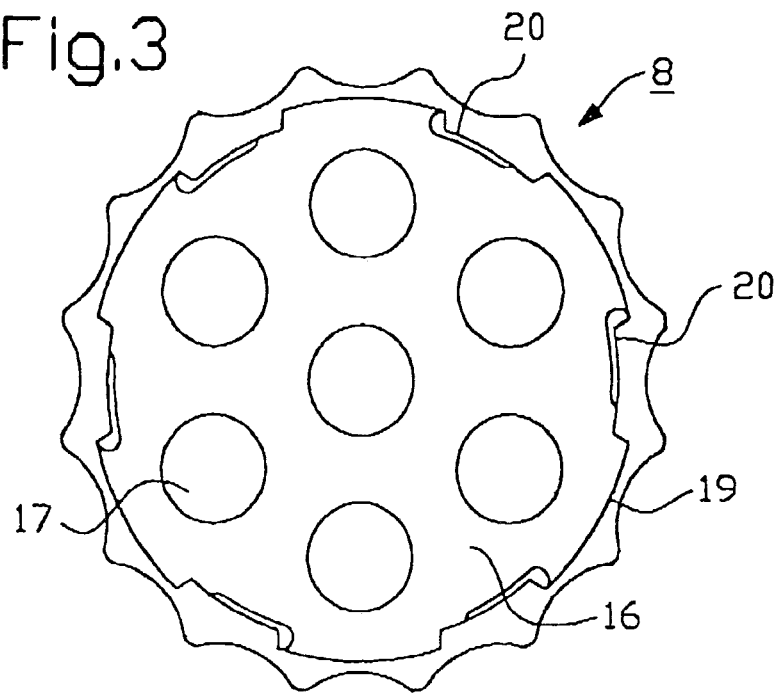
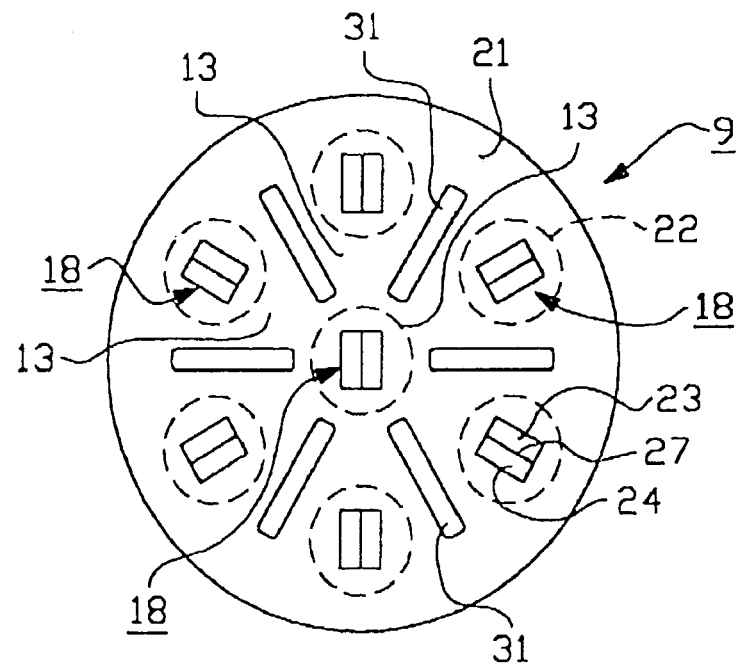

SPRAY HEAD

FIELD OF THE INVENTION

The present invention relates to a spray head for spreading liquid or semi-liquid products, preferably foodstuff. A product feeder is provided to feed or convey a product through a feed conduit from a product container to the spray head. Spraying nozzles are provided to spread the product when it is discharged from the spray head.

BACKGROUND OF THE INVENTION

An important requirement or demand on spraying nozzles for foodstuff, e.g. ketchup, mustard, dressing, sauces and similar is that they after the daily use are easy to disassemble for cleaning. The members forming part thereof shall thereafter be cleaned separately with ease and efficiency and they must be easy to assemble after cleaning.

Since the spraying nozzles of today often consist of many members which might be difficult to clean separately, they do not meet said requirements in a satisfactory way.

SUMMARY OF THE INVENTION

The object of the present invention has been to eliminate this problem, which is arrived at by providing the spray head with the characterizing features of primarily subsequent claim 1.

By providing the spray head with said characterizing features, it is achieved that it can consist of a few members which are easy to assemble and disassemble and which can be cleaned separately with ease. Since the spray head consists of said few members, it is also achieved that it can be manufactured at low costs.

BRIEF DESCRIPTION OF THE DRAWINGS

The invention will be further described below with reference to the accompanying drawings, in which:

FIG. 3 is a plan view from above of a lower coupling member of the spray head of FIG. 1;

FIG. 4 is a plan view from above of a nozzle member of the spray head of FIG. 1;

DESCRIPTION OF AN EXAMPLE EMBODIMENTS

Figure 1:
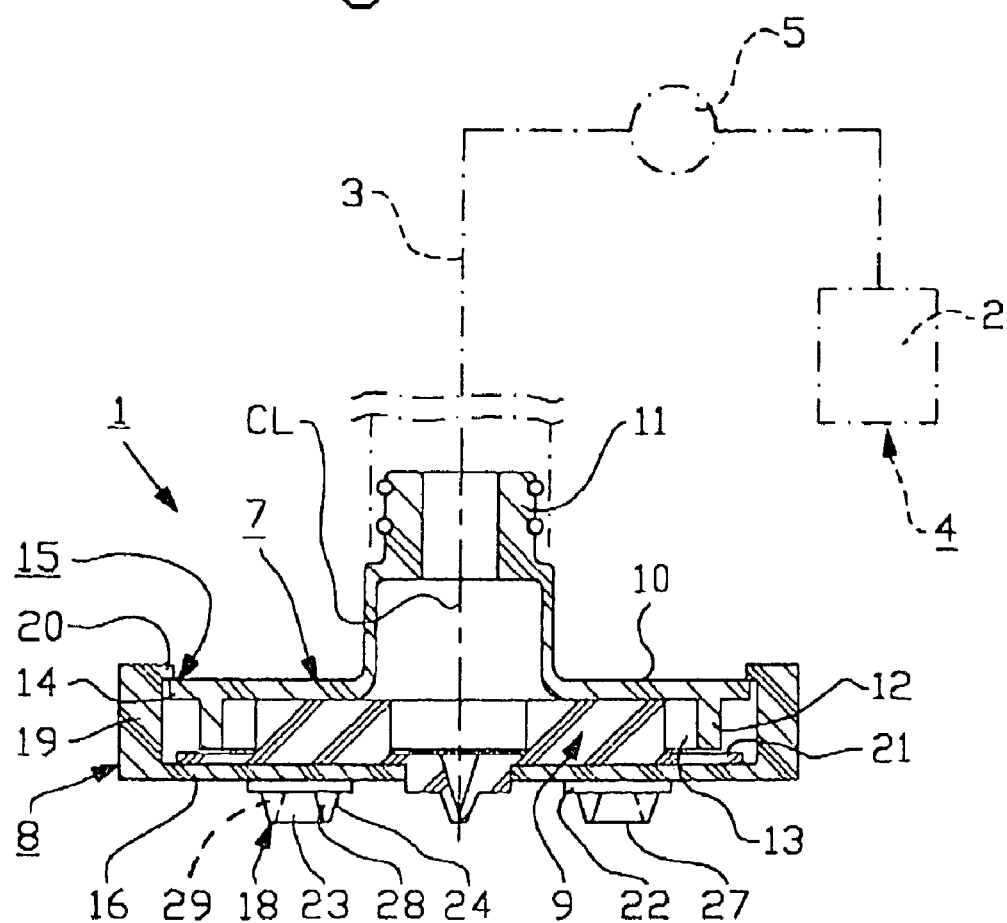
FIG. 1 is a vertical section of a spray head according to the invention.
Figure 2:
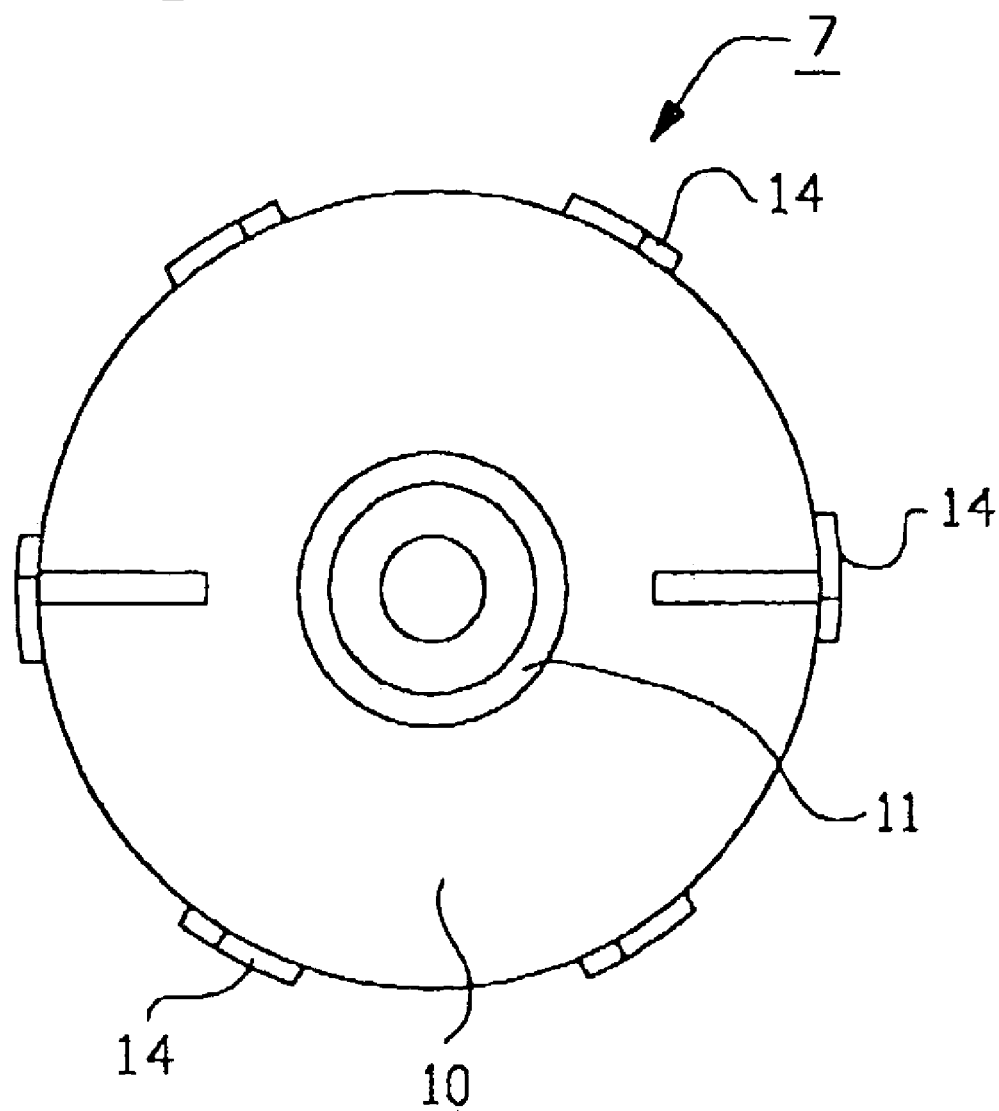
FIG. 2 is a plan view from above of an upper coupling member of the spray head of FIG. 1.
Figure 5:
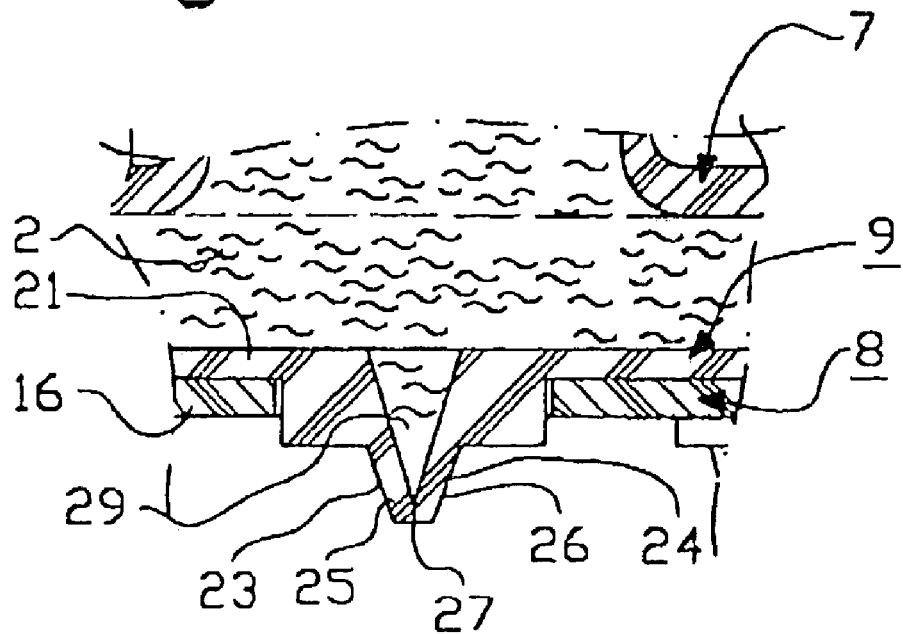
FIG. 5 is a section of a spraying nozzle forming part of the nozzle member of FIG. 4 and shown in closed condition.
Figure 6:
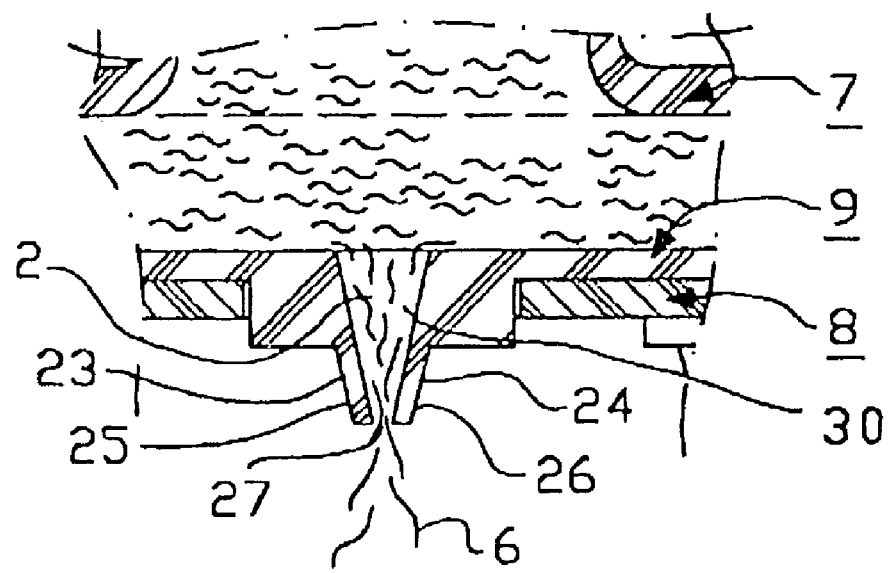
FIG. 6 is a section of the spraying nozzle of FIG. 5 in open condition.

FIG. 1 illustrates a spray head 1 which is adapted for discharging or spreading liquid or semi-liquid products 2, e.g. foodstuff such as ketchup, mustard, dressing, sauces etc. with or without solid constituents, onto a suitable place or object, e.g. a dish of some kind. The spray head 1 is through a feed conduit 3 connected or connectable to a product container 4, e.g. a plastic bag or similar. The feed conduit 3 may be a hose and/or a pipe. A product feeder 5, e.g. a pump or similar, is provided to feed the product from the product container 4, through the feed conduit 3 and the spray head 1, which is adapted to discharge several product streams 6 (see FIG. 6) towards the intended place or object such that the product is distributed or spread thereon.

The spray head 1 consists preferably of three separate members, namely an upper coupling member 7, a lower coupling member 8 and a nozzle member 9 provided therebetween.

The upper coupling member 7 includes preferably an upper circular wall 10 with an upwardly directed pipe piece 11 and these are centered with a geometrical centre line CL which is directed axially relative to the spray head 1. The pipe piece 11 defines an inlet for product 2 to the spray head 1 and this pipe piece 11 is closely connected to the feed conduit 3. The upper wall 10 defines an upper wall of distributing spaces 13 which will be described in more detail below. Said upper wall 10 has a downwardly directed collar 12 which preferably is circular and is centered with the centre line CL and which defines an outer wall of said distributing spaces 13. At its peripheral edges, the upper wall 10 has coupling portions 14 which are directed radially outwards relative to the centre line CL and which are designed such that the upper coupling member 7 defines one half of a bayonet mount 15.

The lower coupling member 8 is preferably designed as a ring with a lower wall 16 which has seven or another suitable number of holes 17 of which one is located in the centre of said lower wall 16 while the other are equidistantly distributed about the centre line CL and adapted for seven or another suitable number of spraying nozzles 18 on the nozzle member 9. The lower coupling member 8 has an annular wall 19 which relative to the centre line CL is directed axially upwards from said lower wall 16 and which surrounds said centre line CL. The upwardly directed wall 19 has coupling portions 20 at the top thereof, which are directed radially inwards towards said centre line CL and which are designed such that the lower coupling member 8 defines a second half of said bayonet mount 15.

The nozzle member 9 consists of elastic polymer material, preferably a silicone material, and it is preferably designed as a unit. This nozzle member 9 includes a disc-like member 21 which preferably is circular and which is designed for location in the lower coupling member 8 such that it engages the lower wall 16 thereof and such that its spraying nozzles 18 protrude through the holes 17.

Each spray nozzle 18 includes or is provided on a downwardly directed, circular thickened member 22 of the disc-like member 21. This thickened member 22 is adapted to the holes 17 and protrude downwards therethrough. On the thickened member 22, there are provided two opposed elastic lips 23, 24 which extend obliquely downwards towards each other and engage down below, with lower parts 25, 26 thereof, each other when the spraying nozzle 18 is closed and define thereby a sealed discharge gap 27. The lips 23, 24 are interconnected through two opposed elastic side walls 28, 29 which together with the lips 23, 24 define a downwardly tapering discharge space 30.

The lips 23, 24 are provided such that when the product 2 by means of the product feeder 5 is fed into the spray head 1 and presses against the lips 23, 24, said lips spring apart such that the discharge gap 27 is opened and the product 2 can flow out of the spray nozzle 18. The lips 23, 24 are provided to spring back when the pressure ceases and their lower parts 25, 26 will again engage each other such that the discharge gap 27 is closed. Hereby, each spraying nozzle 18 acts as an automatically operating check valve.

The nozzle member 9 may also include six or another suitable number of distributing walls 31 which extend in a radial direction out from the centre line CL and which define six or another suitable number of distributing spaces 13 of which each space 13 has a spraying nozzle 18. At the embodiment shown, the distributing walls 31 are located such that the distributing spaces 13 distribute the same or substantially the same amount of product 2 to the seven different spraying nozzles 18.

During assembly of the upper and lower coupling members and the nozzle member 9 to each other, the nozzle member 9 is located in the lower coupling member 8. Then, the upper coupling member 7 is inserted into the lower coupling member 8 until the coupling portions 14 of the upper coupling member 7 are located in a plane beneath the coupling portions 20 of the lower coupling member 8. This is made possible while the coupling portions 14 of the upper coupling member 7 can be moved through spaces between the coupling portions 20 of the lower coupling member 8. Thereafter, the lower coupling member 8 is rotated in one direction relative to the upper coupling member 7 or vice versa, whereby the coupling portions 14, 20 come in contact with each other and the disc-like member 21 of the nozzle member 9 is pressed by the collar 12 on the upper coupling member 7 against the lower wall 16 of the lower coupling member 8, whereby the coupling members 7, 8 and the nozzle member 9 will be attached to each other.

When the three members of the spray head 1, namely the upper and lower coupling members 7, 8 and the nozzle member 9 shall be disassembled, e.g. for cleaning of the members separately after the daily use, the lower coupling member 8 is rotated relative to the upper coupling member 7, or vice versa, in the opposite direction as said direction of rotation for assembly, whereupon the coupling members 7, 8 can be moved apart and the nozzle member 9 removed from the lower coupling member 8.

The invention is not limited to what is described above and illustrated in the drawings, but may vary within the scope of the subsequent claims. Finally, as an example of an alternative embodiment, it can be mentioned that the spray head 1 may include one or more additional members except the coupling members 7, 8 and the nozzle member 9, and the distributing walls 31 can be provided on the upper coupling member 7 instead of being provided on the nozzle member 9.

The invention claimed is:

1. An apparatus for spreading a flowable product (2), said apparatus comprising:
   a product container (4) for containing the flowable product (2); and
   a spray head (1) for receiving the flowable product (2) from the product container (4) through a product feeder (5), said spray head (1) discharging and spreading the flowable product (2),
   said spray head (1) having an upper coupling member (7) connected to a feed conduit (3), a lower coupling member (8), and a nozzle member (9) disposed between said upper coupling member (7) and said lower coupling member (8), said upper coupling member (7) and said lower coupling member (8) being tightly attached and interconnected to each other when spreading the flowable product (2),
   said upper coupling member (7) and said nozzle member (9) together defining a space (13) for distributing the flowable product (2) being fed through the feed conduit (3) into said spray head (1) to said nozzle member (9),
   said nozzle member (9) having spraying nozzles (18) for discharging the product (2) when said spraying nozzles (18) are subjected to pressure by the product (2), said spraying nozzles (18) being closed when said spraying nozzles (18) are not subject to pressure by the flowable product (2),
   said upper and lower coupling members (7, 8) being disconnectable from each other, said nozzle member (9) being removable from said upper and lower coupling members (7, 8) when said upper and lower coupling members (7, 8) have been disconnected from each other,
   said upper coupling member (7) including an upper wall (10) having an inlet (11) for the product (2), said upper wall (10) having a downwardly directed collar (12) defining an outer wall of said space (13), said collar (12) engaging a disc member (21) of the nozzle member (9), said nozzle member (9) having distributing walls (31) extending in a radial direction outwards from an axially directed, geometric centre line (CL), said axially directed, geometric centre line (CL) extending through said spray head (1), said distributing walls (31) defining said space (13).

2. The apparatus as set forth in claim 1 wherein said distributing walls (31) define said space (13) and said spraying nozzles (18) are formed as a unit with said nozzle member (9).

3. The apparatus as set forth in claim 2 wherein said nozzle member (9) is formed of a polymer material.

4. The apparatus as set forth in claim 1 wherein said spraying nozzles (18) each include two elastic lips (23, 24), each said elastic lip (23, 24) having lower parts (25, 26) engaging each other and defining, when said spraying nozzle (18) is closed, a sealed discharge gap (27), said lips (23, 24), when subjected to pressure from the flowable product (2), springing apart from each other such that said sealed discharge gap (27) is opened, said lips (23, 24) springing toward each other for sealing said discharge gap (27) when pressure from the flowable product (2) ceases.

5. The apparatus as set forth in claim 1 wherein said spray head (1) consists of only said upper and lower coupling members (7, 8) and said nozzle member (9).

6. The apparatus as set forth in claim 5 wherein said upper and lower coupling members (7, 8) are releasable from each other for permitting removal of said nozzle member (9) for cleaning.

7. The apparatus as set forth in claim 1 wherein said lower coupling member (8) defines a ring having a lower wall (16) and an upwardly directed wall (19) disposed about said geometrical centre line (CL), said geometric center line (CL) extending axially relative to said spray head (1), said upwardly directed wall (19) extending axially relative to said centre line (CL), said upwardly directed wall (19) having radially extending coupling portions (20), said upper and lower coupling members (7, 8) being joined together to form a bayonet mount (15).

* * * * *